R. K. TELLER.
KITCHEN KNIFE AND METHOD OF MAKING.
APPLICATION FILED MAR. 17, 1919.
1,366,610.
Patented Jan. 25, 1921.
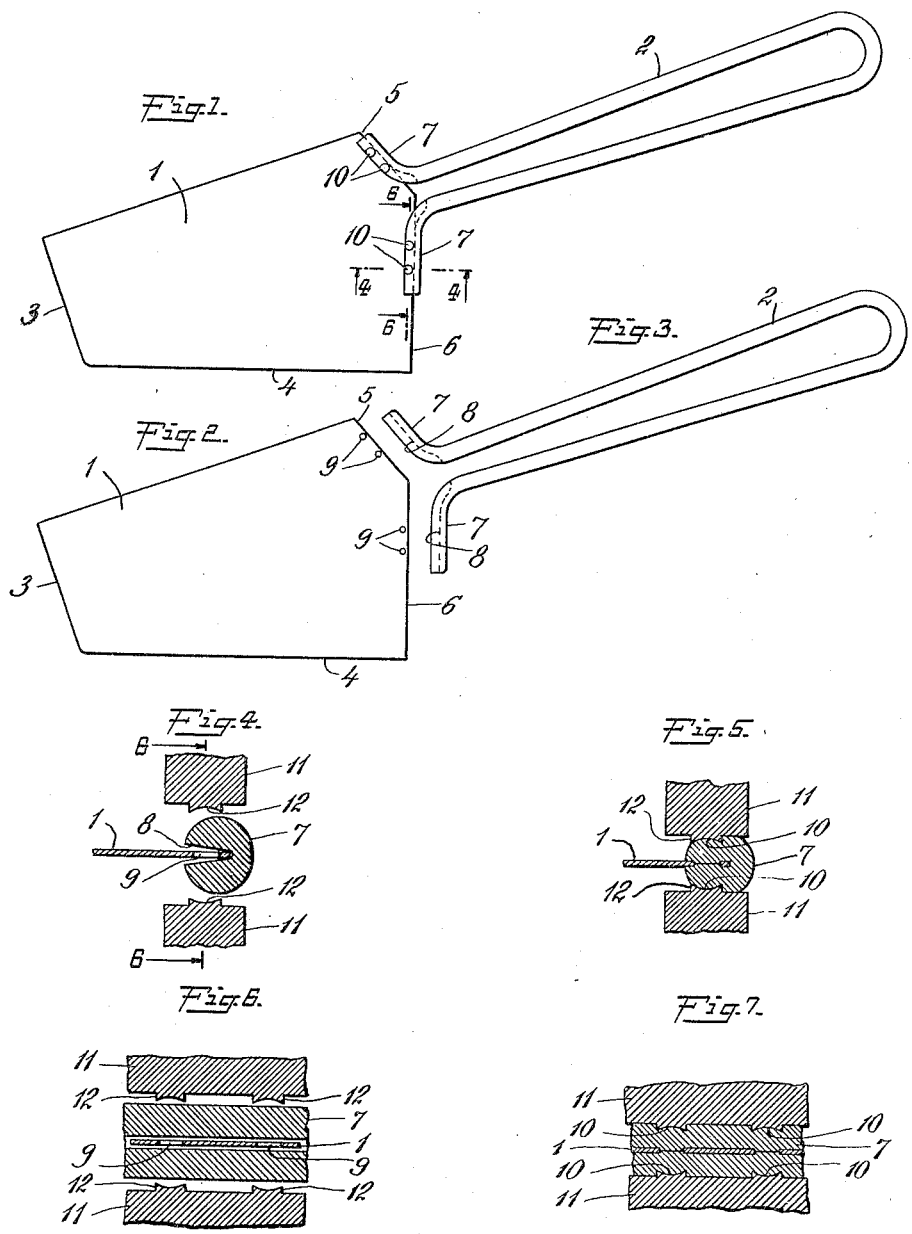
INVENTOR
Rufus K. Teller
BY S. Jay Teller
ATTORNEY

UNITED STATES PATENT OFFICE.

RUFUS K. TELLER, OF UNADILLA, NEW YORK.

KITCHEN-KNIFE AND METHOD OF MAKING.

1,366,610.   Specification of Letters Patent.   Patented Jan. 25, 1921.

Application filed March 17, 1919. Serial No. 283,192.

*To all whom it may concern:*

Be it known that I, RUFUS K. TELLER, a citizen of the United States, residing at Unadilla, in the county of Otsego and State of New York, have invented certain new and useful Improvements in Kitchen-Knives and Methods of Making, of which the following is a specification, reference being had therein to the accompanying drawing.

The invention relates particularly to a kitchen knife of the type presented in my Design Patent No. 43,729 dated March 18, 1913. One object of the invention is to provide a knife having an improved connection between the handle and the blade. A further object of the invention is to provide an improved method of effecting the connection between the handle and the blade.

Of the accompanying drawing which shows the preferred embodiment of the invention:

Figure 1 is a side view of the knife.

Fig. 2 is a side view of the blade.

Fig. 3 is a side view of the handle.

Fig. 4 is an enlarged fragmentary sectional view taken along the line 4—4 of Fig. 1 and showing the handle and blade before being connected. This view also shows two squeezing plates adapted to be used in accordance with my improved method.

Fig. 5 is a view similar to Fig. 4 but showing the handle engaged with the blade.

Fig. 6 is an enlarged fragmentary sectional view taken along the lines 6—6 of Figs. 1 and 4.

Fig. 7 is a view similar to Fig. 6 but showing the handle engaged with the blade.

Referring to the drawing 1 represents the blade and 2 the handle of a knife embodying the invention. The blade is made of resilient sheet metal and is provided with two working edges 3 and 4 of different lengths and at an obtuse angle to each other. Opposite the shorter working edge 3, the blade is provided with edges 5 and 6, meeting at an obtuse angle.

The handle 2 is made of soft wire and is of loop form. It is arranged perpendicularly to the shorter working edge 3. The end parts 7, 7 of the handle wire are turned outward to conform to the angle between the blade edges 5 and 6, and these out turned ends are slotted at 8, 8 to receive the blade. This slotting may be effected by sawing or by splitting or in any other satisfactory manner.

The parts of the blade which enter the handle slots are provided respectively with pairs of holes 9, 9. The slotted parts of the handle are closed upon the blade and the outer surfaces opposite the holes are depressed at 10, 10, thus enabling the metal of the handle to be entered in the holes at both sides thereof. By this construction I provide what may be termed integral rivets connecting the handle and the blade. The two parts are thus very firmly connected and accidental disengagement is impossible.

In making the knife the holes 9, 9 are formed in the blade and the handle is shaped and slotted. Then the blade and the handle are placed in assembled relation with the blade entering the slots. Use is made of two oppositely disposed squeezing plates 11, 11 carrying small die heads 12, 12 positioned opposite each other and adapted to register with the respective holes 9, 9 in the blade. The blade and the handle, assembled as described, are placed between the squeezing plates 11, 11 with the die heads 12, 12 in register with the holes 9, 9. Then the squeezing plates are forced together thus applying pressure to the outside surfaces of the slotted parts of the handle to close them upon the blade. The projecting die heads 12, 12 cause the pressure to be greatest at positions opposite the holes, thus depressing the metal of the handle at the said outer surfaces and causing it to enter the holes at both sides. In this way there are formed the integral rivets before described.

What I claim is:—

1. A knife for kitchen use, comprising a resilient sheet metal blade with two working edges of different lengths and at an obtuse angle, and a soft wire handle opposite and perpendicular to the shorter working edge of the blade and having the end parts thereof slotted to receive the blade, the edge parts of the blade within the handle slot having holes therein and the metal of the handle being entered in the holes at both sides and being depressed at the outer surfaces opposite the holes.

2. The herein described method of making a knife for kitchen use, comprising a resilient sheet metal blade with two working edges of different lengths and at an obtuse angle and a soft wire handle opposite and perpendicular to the shorter working edge of the blade, the said method consisting in slotting the end parts of the wire handle, in forming holes in the edge parts of the blades at the places of handle engagement, in placing the handle and blade in assembled relation with the blade entering the slots, in applying pressure to the opposite surfaces of the slotted parts of the handle to close them upon the blade, and in causing the pressure to be greatest at positions opposite the holes in the blade whereby the metal of the handle is depressed at the outer surfaces and is entered in the holes at both sides.

In testimony whereof, I affix my signature.

RUFUS K. TELLER.